(12) United States Patent
Köhler et al.

(10) Patent No.: US 6,634,081 B2
(45) Date of Patent: Oct. 21, 2003

(54) METHOD OF MANUFACTURING CORE LAMINATIONS FOR LAMINATED CORES OF ROTORS AND/OR STATORS

(75) Inventors: Erich Köhler, Cleebronn (DE); Gerd Rommel, Freudental (DE)

(73) Assignee: Kienle & Spiess Stanz- ung Druckgiesswerk GmbH, Sachsenheim (DE)

( * ) Notice: Subject to any disclaimer, the term of this patent is extended or adjusted under 35 U.S.C. 154(b) by 0 days.

(21) Appl. No.: 09/877,753

(22) Filed: Jun. 8, 2001

(65) Prior Publication Data

US 2002/0008435 A1 Jan. 24, 2002

(30) Foreign Application Priority Data

| Jun. 9, 2000 | (DE) | 100 28 200 |
| Aug. 3, 2000 | (DE) | 100 37 804 |

(51) Int. Cl.⁷ ................... H02K 15/00; B23P 19/00; B26D 3/00
(52) U.S. Cl. ............. 29/596; 29/738; 29/DIG. 37; 83/40
(58) Field of Search ............ 29/240, 596–598, 29/605–609, 732, 736, 738, DIG. 37; 83/50, 55, 35, 36, 13, 40; 72/379.2; 310/256

(56) References Cited

U.S. PATENT DOCUMENTS

| 2,308,277 | A | * | 1/1943 | Gillen | 29/417 |
| 3,107,566 | A | * | 10/1963 | Archer | 156/261 |
| 4,998,430 | A | * | 3/1991 | Howe | 72/329 |
| 5,382,859 | A | * | 1/1995 | Huang et al. | 310/216 |
| 6,127,753 | A | * | 10/2000 | Yamazaki et al. | 310/194 |
| 6,226,856 | B1 | * | 5/2001 | Kazama et al. | 29/596 |

\* cited by examiner

*Primary Examiner*—Carl J. Arbes
*Assistant Examiner*—Tim Phan
(74) *Attorney, Agent, or Firm*—Gudrun E. Huckett

(57) ABSTRACT

Core laminations for laminated cores of rotors and stators are partially made of partial ring segments that are at least partially stamped out of a central part produced as a remainder in a piece of sheet metal when manufacturing annular core laminations.

11 Claims, 10 Drawing Sheets

Fig.10

METHOD OF MANUFACTURING CORE LAMINATIONS FOR LAMINATED CORES OF ROTORS AND/OR STATORS

BACKGROUND OF THE INVENTION

1. Field of the Invention

The invention relates to core laminations for laminated cores of rotors and/or stators for generators, motors, starter generators, generator starters and the like as well as a method for manufacturing such core laminations, wherein a full ring is stamped of a sheet metal strip, wherein the full ring surrounds a center part of the sheet metal strip that is stamped out.

2. Description of the Related Art

For stators and rotors it is known to stamp full ring laminations of a sheet metal strip and to stack them to form laminated stator or rotor cores. The stamping process leaves behind a disk-shaped center part which results in scrap or waste material.

SUMMARY OF THE INVENTION

It is an object of the present invention to configure the core laminations of the aforementioned kind and the method of the aforementioned kind such that the sheet metal strip can be used in an optimal way for manufacturing rotors and/or stators.

In accordance with the present invention, this is achieved in regard to the core laminations in that the core laminations of the rotor and/or the stator are combined at least partially of partial ring segments which are cut or separated at least partially from the center part which remains when manufacturing the annular core laminations from the sheet metal.

In accordance with the present invention, the object is achieved in regard to the method in that at least one partial ring segment is cut out of the center part of the sheet metal enclosed by the full ring.

The center part, which remains of the sheet metal when manufacturing the full rings, is used according to the invention for producing partial ring segments. The rings for the rotors and/or stators can be assembled of such partial ring segments. The sheet metal strip which is used for manufacturing the laminated core is thus used optimally so that the material waste is only very small.

DESCRIPTION OF THE PREFERRED EMBODIMENTS

Figure 1:
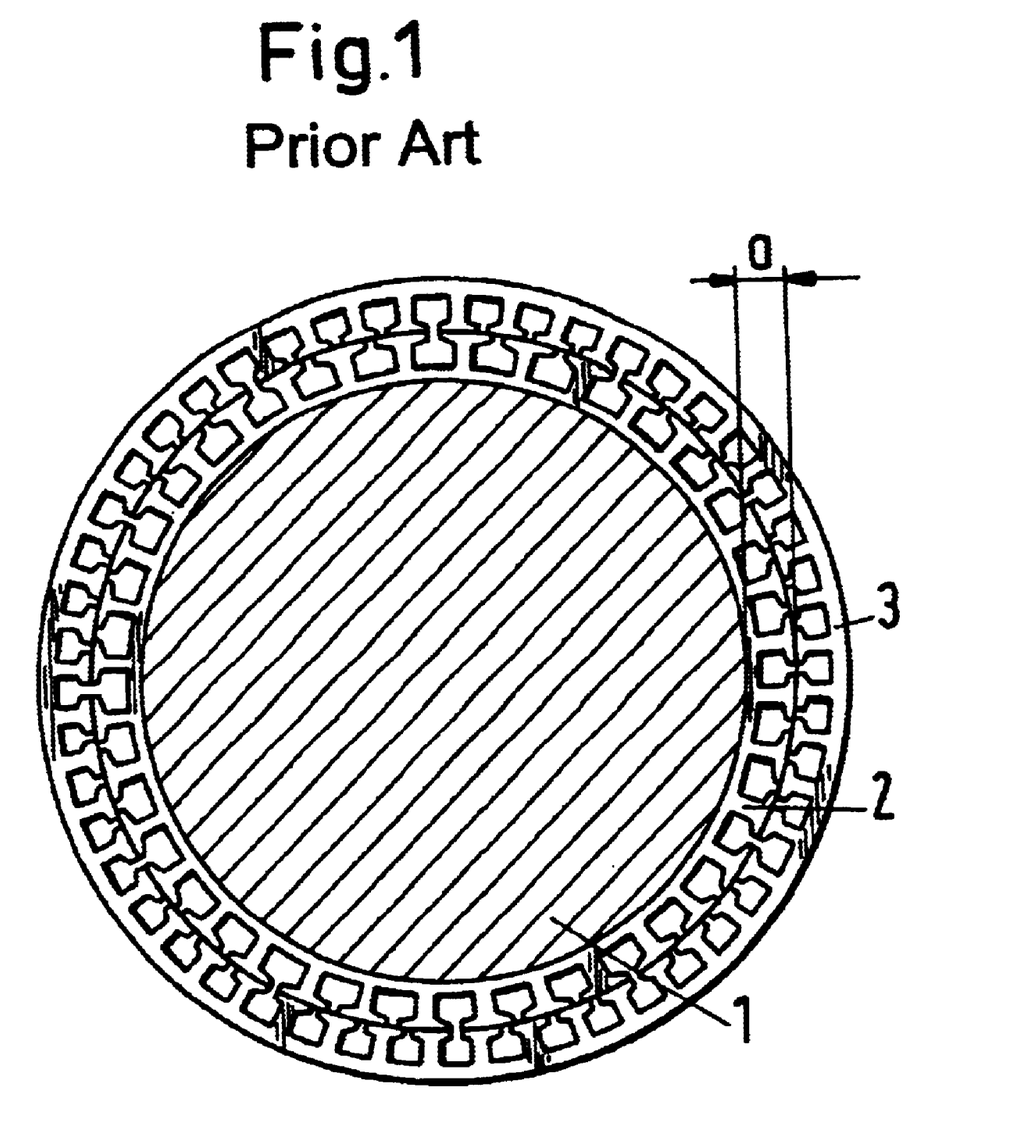
FIG. 1 shows an outer ring and an inner ring stamped of a sheet metal material as well as the remaining center part for a known core lamination.

For manufacturing generators, motors, or a combination of the two, the so-called starter generators or generator starters, annular core laminations are stamped out of sheet metal strip. The resulting annular core laminations are stacked to form stacked laminations and are connected to one another to form laminated cores. Stators and rotors are manufactured of these laminated cores. FIG. 1 shows a conventional embodiment of annular laminations 2 and 3 which are stamped concentrically to one another of the sheet metal (not illustrated in FIG. 1). The outer ring 3 serves for manufacturing a stator and the inner ring 2 for manufacturing a rotor; in the case of an external rotor engine machine the reverse arrangement is employed. The remaining center part 1 of the sheet metal, the inner waste or scrap part, is waste material. Since the inner ring 2 has only a minimal width a, a relatively high scrap (waste) metal proportion (1) results.

Figure 2:
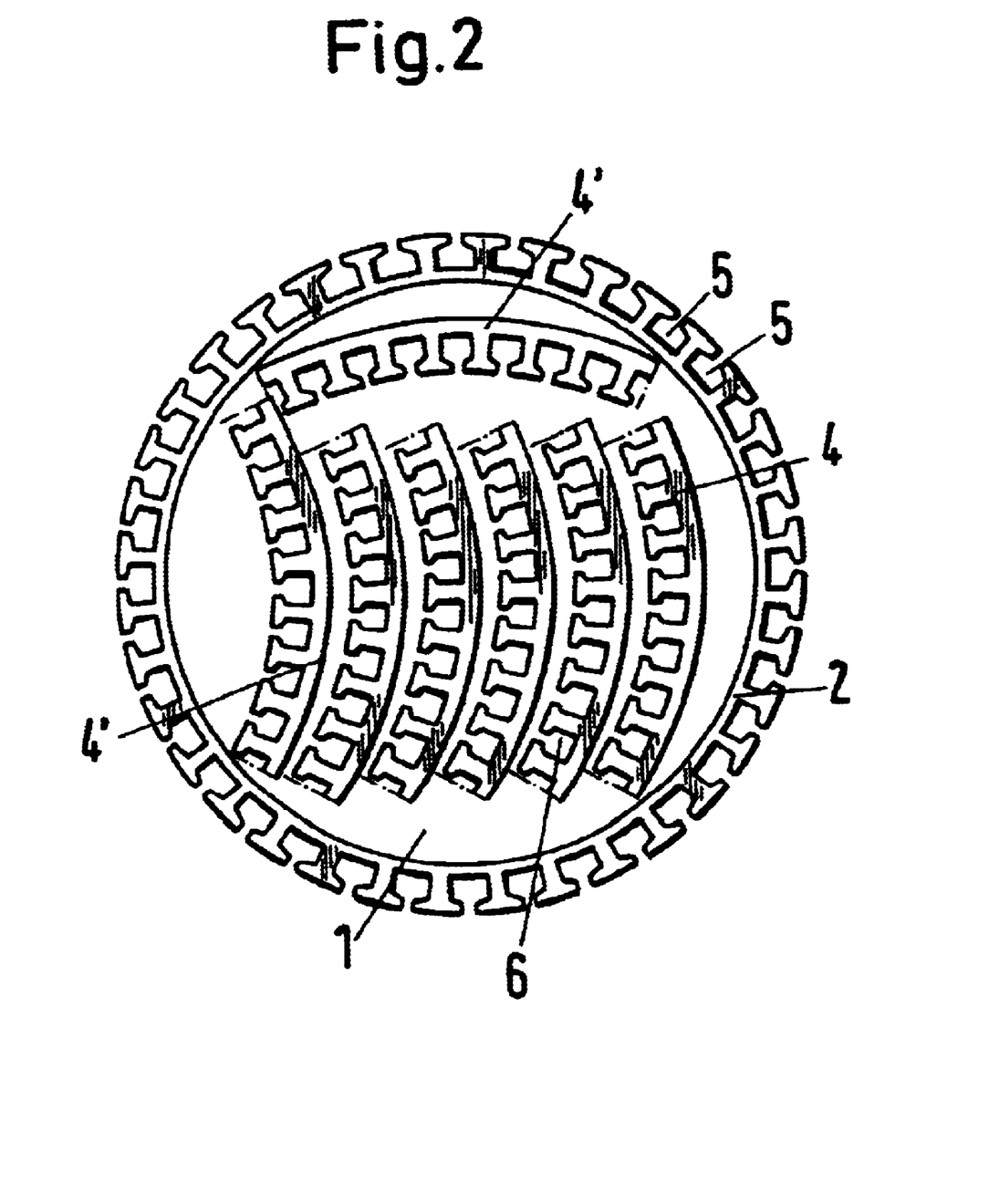
FIG. 2 shows in a representation corresponding to FIG. 1 a first embodiment according to the invention in which an outer ring is stamped out of the sheet metal and partial ring segments are stamped out of the center part enclosed by the outer ring.

FIG. 2 shows a first embodiment wherein the center part 1 is used for manufacturing the outer ring. The inner ring 2 is stamped as a full ring (continuous or integral ring) out of the sheet metal (not illustrated). During the manufacture of this inner ring 2 in a follow-on tool, or also in a separate working step, partial ring segments 4 are produced out of the center part 1 and the outer ring 3 is manufactured of these ring segments 4 in a further working step. The partial ring segments 4 can also be produced in a separate working step, for example, by laser cutting, plasma cutting, water jet cutting, stamping and the like. The partial ring segments 4 are provided at their two ends with positive-locking elements (not illustrated) with which they can be assembled to form a full ring. The partial ring segments 4 can extend across the same arc angle. However, it is also possible to configure the partial ring segments 4 so as to have different lengths in order to use in this way the surface area of the center part 1 in an optimal way. In the illustrated embodiment, the two partial ring segments 4' are longer than the other ring segments 4 which are identical. When comparing this arrangement with FIG. 1, the material waste in comparison to the known embodiment is substantially reduced. Accordingly, only a minimally higher total starting material weight in comparison to the weight of the final product is required so that at very high degree of material utilization is achieved.

The inner ring 2 formed as a full ring has grooves 5 at its outer circumference or periphery as is known in the art while the partial ring segments 4, 4' for producing the outer ring have grooves 6 at their inner side as is known in the prior art.

Since the inner rings 2 are full rings, the rotor produced of these inner ring laminations can be operated with high rpm during its future use. The stator to be produced of the partial ring segments 4 is stationary in its future use so that the division of the stator ring into individual partial ring segments 4, 4' is possible without problems. The number of partial ring segments 4, 4' for the stator ring 3 can be selected as desired. The partial ring segments 4, 4' are configured such that the outer ring produced thereof has the same curvature center point as the inner ring 2.

The partial ring segments 4, 4', when used in machines with a large number of poles such as starter generators, can advantageously be placed in the stamping direction such that the poles are in the preferred direction of magnetization. This has the advantage that the stator ring assembled of the partial ring segments 4, 4' ensures a homogenous magnetic flux over its circumference. Generally, in the case of multi-pole machines the inductions in the teeth or the magnetic drop in the teeth is considerably higher than in the yoke so that advantages results by placing the partial ring segments 4, 4' with the teeth or poles in the rolling direction.

When used in machines with a small number of poles, i.e., two and four-pole machines, it is beneficial when the partial ring segments 4, 4' are rotated by 900 so that the magnetic drop at the yokes is smaller.

The partial ring segments 4, 4' can accordingly be positioned depending on the application requirements.

Figure 5:
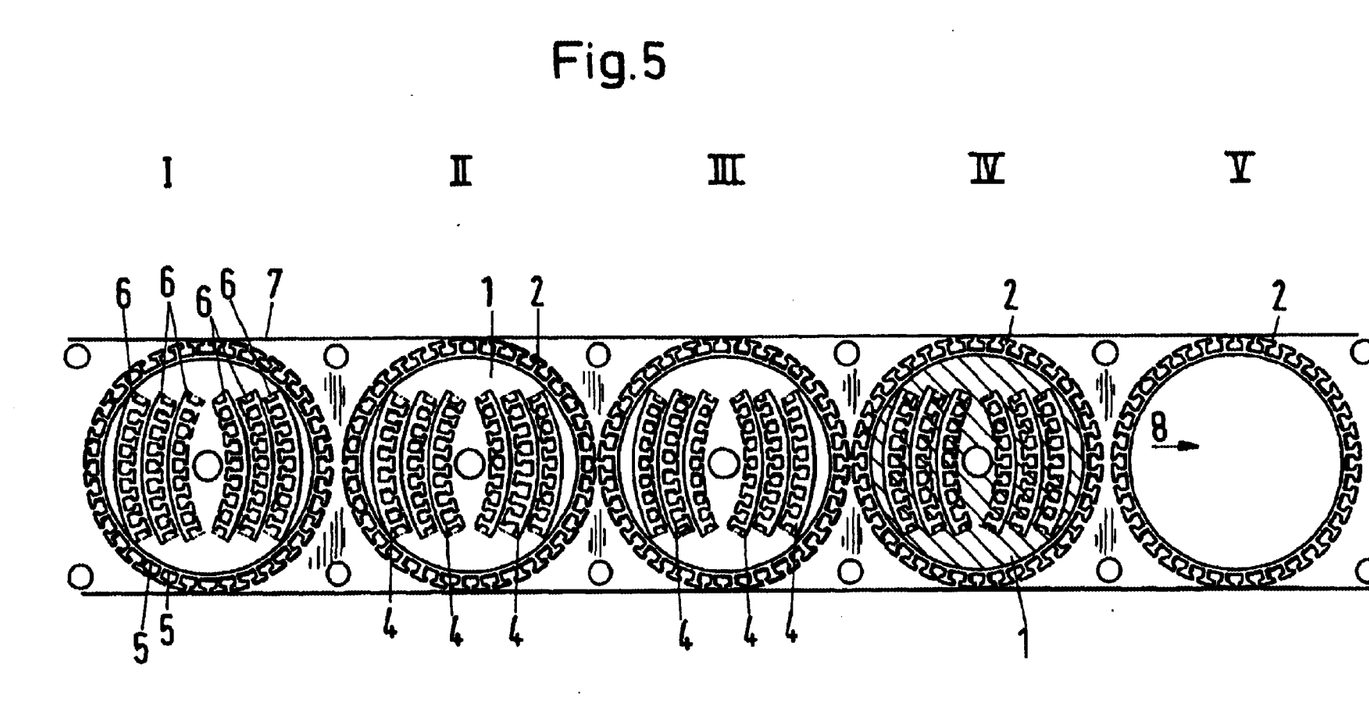
FIG. 5 shows a stamping sequence for manufacturing the full ring and the partial ring segments according to FIG. 2.

FIG. 5 shows the manufacture of the inner ring 2 and of the partial ring segments 4, 4'. The sheet metal strip 7 is a narrow strip which is only somewhat wider than the outer diameter of the inner rings 2. In a first stamping step I the grooves for the inner ring 2 and the grooves 6 for the partial ring segments 4, 4' are stamped. In the further stamping steps II and III the partial ring segments 4 are stamped out of the sheet metal strip 7. In this connection, the second partial ring segments 4 are stamped, respectively, in the stamping step II. In the third stamping step III the other partial ring segments 4 are stamped. In contrast to the embodiment according to FIG. 2, all partial ring segments 4 have the same length. In this connection, the partial ring segments 4 are distributed onto two halves of the center part 1 and, relative to the transverse center plane positioned perpendicularly to the axis of the sheet metal strip 7, are mirror-symmetrically arranged to one another.

In the stamping step IV the center part 1 is stamped out of the inner ring 2. In the last stamping step V the inner ring 2 is separated from the sheet metal strip 7 by stamping the outer periphery.

The center part 1 with the partial ring segments 4, already stamped out in the stamping steps II and III, is removed in the stamping step IV in a suitable manner from the sheet metal strip 7.

The partial ring segments 4 are positioned transversely to the stamping direction 8 and thus also to the rolling direction of the sheet metal strip 7. Accordingly, the grooves 6 of the partial ring segments 4 are positioned approximately in the stamping direction 8 so that in the assembled stator the poles are in the preferred direction of magnetization and in this way a homogenous magnetic flux within the stator is ensured.

Figure 3:
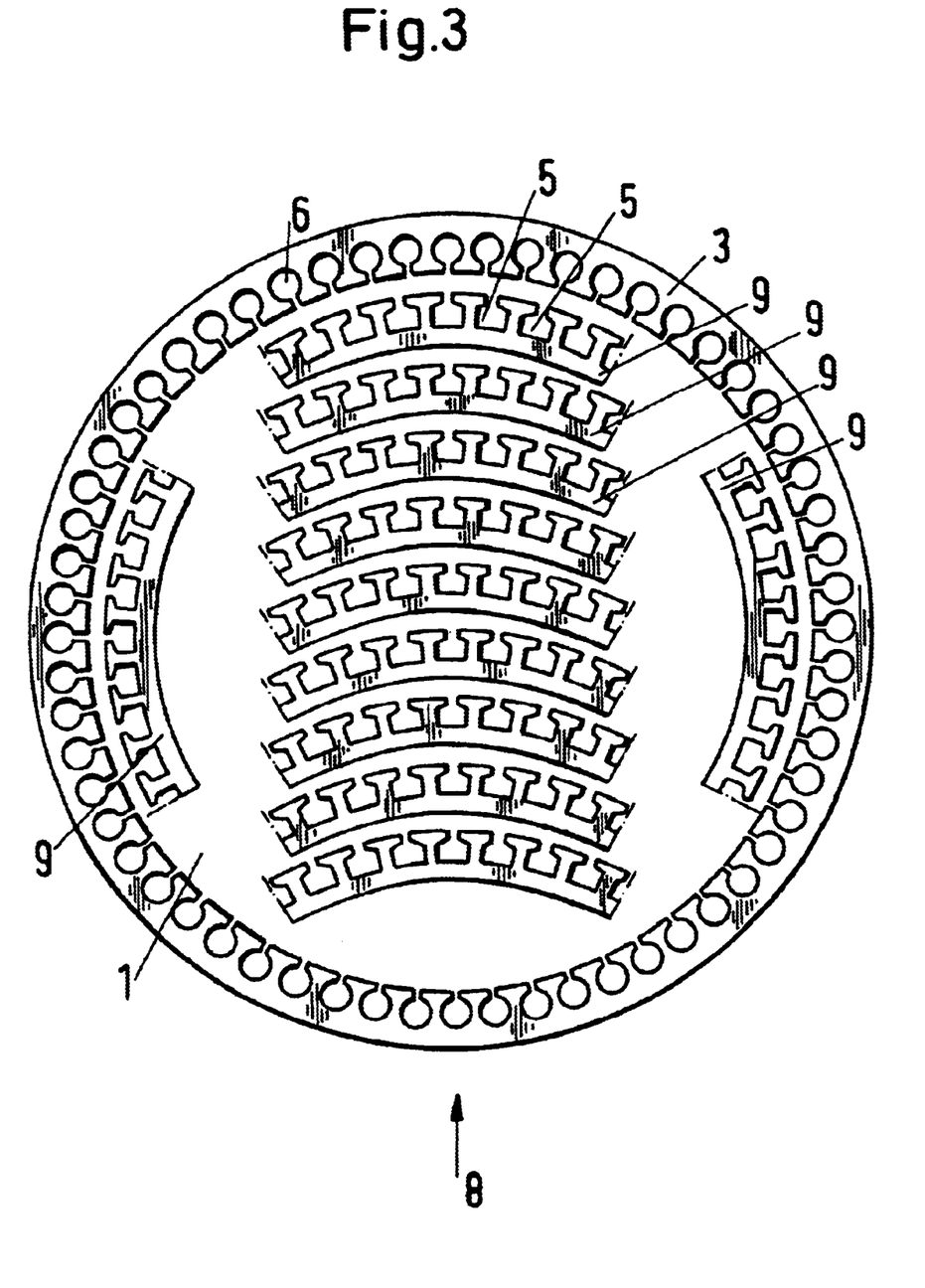
FIG. 3 shows in a representation corresponding to FIG. 2 a second embodiment according to the invention.

FIG. 3 shows the situation of an external rotor machine in which the outer ring forms the rotor and the inner ring forms the stator. In this embodiment, the inner ring is comprised of individual partial ring segments 9 while the outer ring is a full (continuous) ring. The partial ring segments 9 for the inner ring have the same length in the illustrated embodiment, but can also be of a different length, as indicated in an exemplary fashion in FIG. 2. The grooves 5 of the partial ring segments 9 are provided at the outer circumference while the grooves 6 of the full ring 3 are arranged at the inner circumference.

Almost all partial ring segments 9 are positioned in the stamping direction 8 of the sheet metal strip (not illustrated) successively and parallel to one another with minimal spacing. On both sides of these partial ring segments 9 there is still space within the center part 1 for one partial ring segment 9, respectively. These additional ring segments 9 extend perpendicularly to the partial ring segments 9 positioned at half the width of the center part 1, respectively.

In this embodiment, approximately all partial ring segments 9 are arranged relative to the stamping direction 8 such that their grooves 5 extend substantially in the stamping direction 8. As has been explained in connection with the partial ring segments 4, 4', they can be positioned differently relative to the rolling direction of the sheet metal strip depending on the application. In the embodiments still to be described, the partial ring segments can also be positioned at any desired angle relative to the rolling direction of the sheet metal strip.

Figure 4:
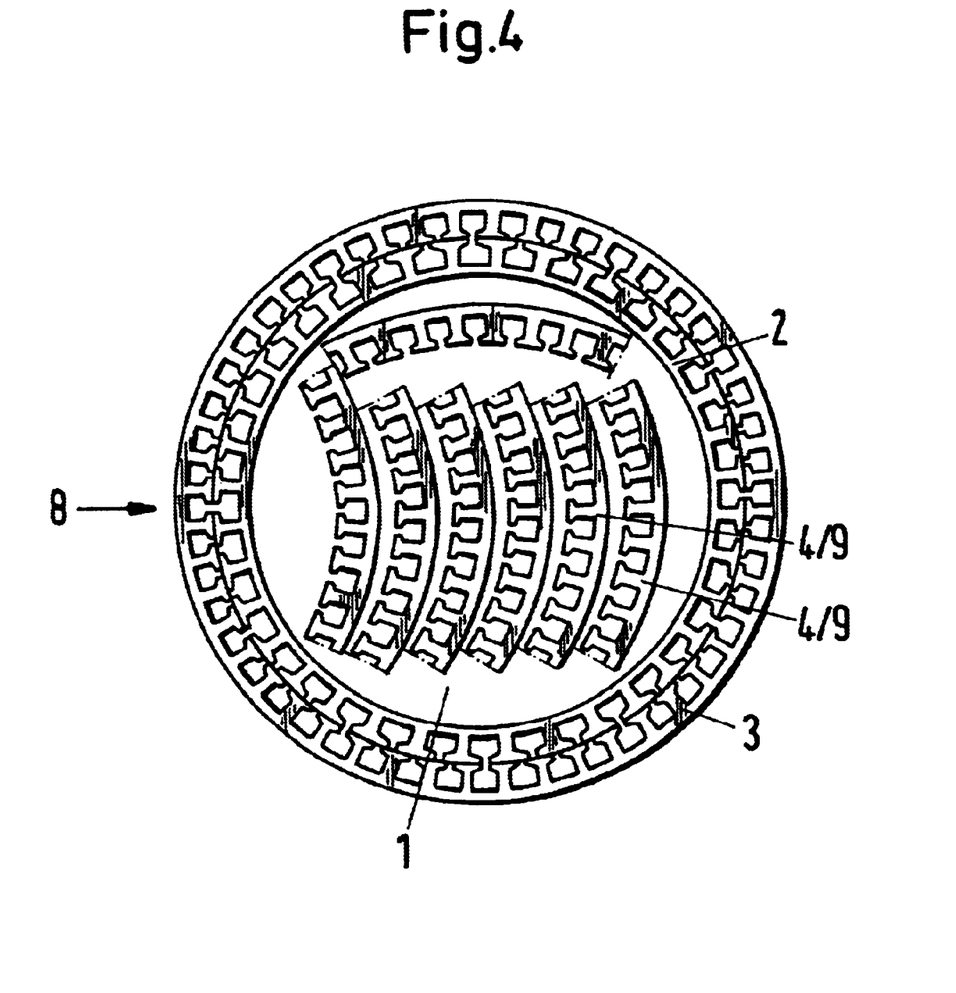
FIG. 4 illustrates a third embodiment according to the invention.

FIG. 4 shows the possibility to form the inner as well as the outer rings 2, 3 as full (continuous or integral) rings. In this embodiment partial ring segments 4 or 9 can be produced in the center part 1, and inner and/or outer rings can be formed thereof. In the illustrated embodiment these partial ring segments are arranged in the same way in the center part 1 as in the embodiment according to FIG. 2. Of course, in this case it is also possible to arrange the partial ring segments in the center part 1 according to the embodiment of FIG. 3 or according to FIG. 5. Almost all partial ring segments 4/9 are arranged in correspondence to the previous embodiments so as to be aligned in the stamping direction 8 so that their poles are arranged in the preferred direction of magnetization and, correspondingly, a homogenous magnetic flux results.

Figure 6:
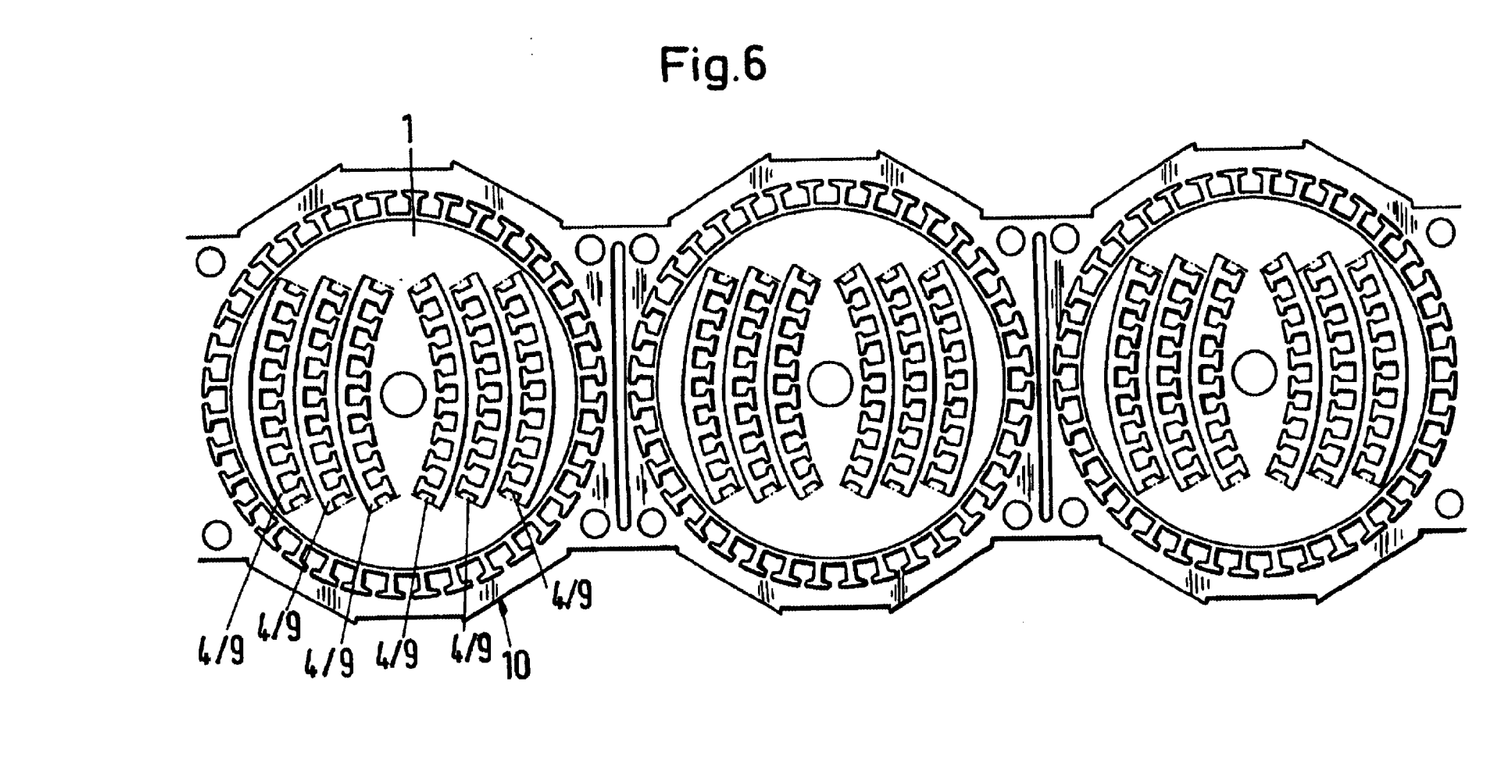
FIG. 6 shows the use of a scroll strip for stamping an outer ring and the partial ring segments according to FIG. 2.

FIG. 6 shows the possibility to produce the full rings and partial ring segments of a scroll strip 10. Such strips 10 are characterized in that they are constricted in the area between the full rings to be stamped. The stamping sequence is otherwise identical to that explained in an exemplary fashion in the embodiment according to FIG. 5. The partial ring segments 4/9 are produced of the center part 1. The partial ring segments can be arranged differently, as has been explained in connection with FIGS. 2 to 5. When it is desired to stamp two full rings in the scroll strip 10, as is illustrated in an exemplary way in FIG. 4, then the manufacture of the second full ring is carried out in an additional stamping step.

Figure 7:
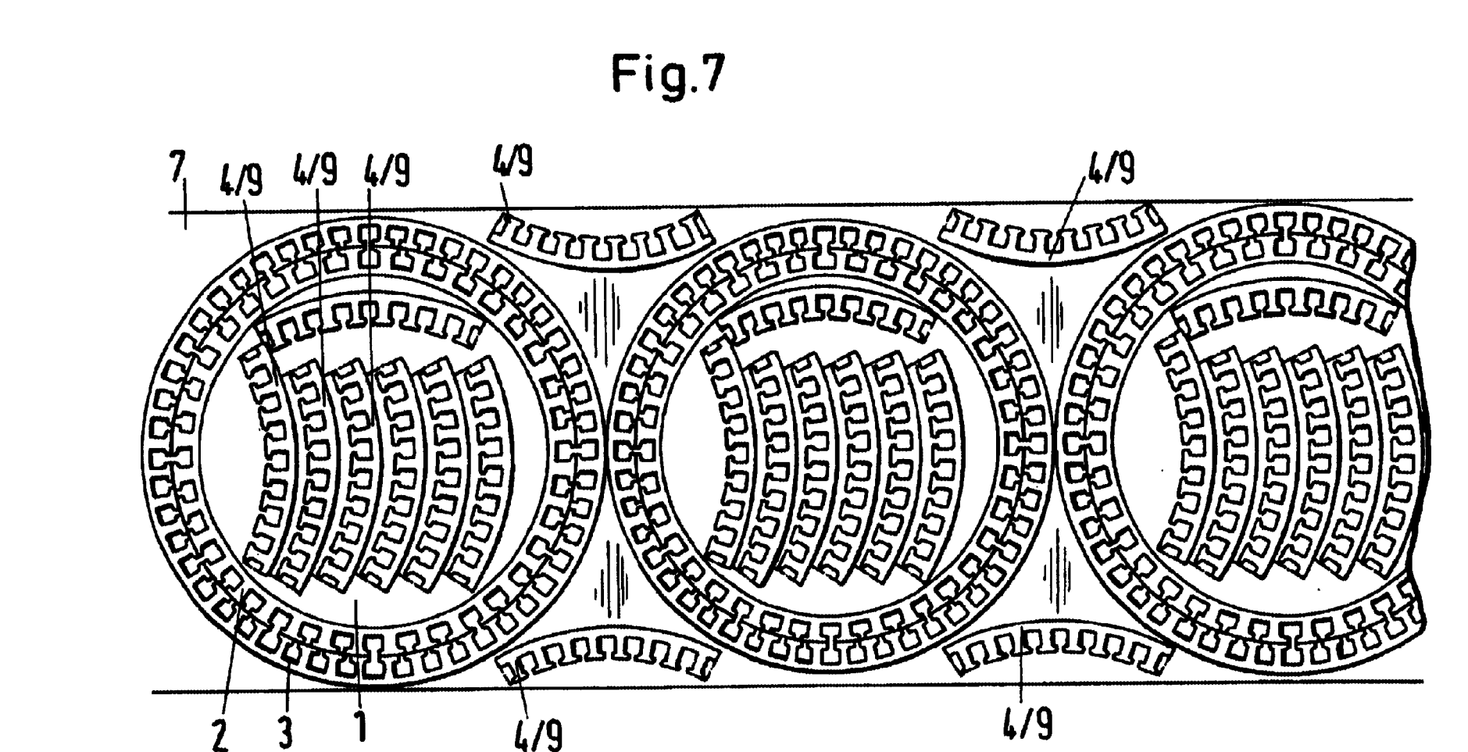
FIG. 7 is a further embodiment of a sheet metal strip from which full rings and partial ring segments are stamped.

FIG. 7 shows the possibility to use the sheet metal strip 7 optimally in that the partial ring segments 4/9 are produced not only in the center part 1 but also in the area between the full rings directly within the sheet metal strip 7. Accordingly, the sheet metal material can be used to an even greater extent for the manufacture of the rings. These partial ring segments 4/9 provided external to the center part 1 can be identical or different as in the case of the partial ring segments 4/9 produced of the center part 1. In this connection, it is also possible to form the partial ring segments 4/9 produced in the sheet metal strip 7 differently. In FIG. 7 the partial ring segments 4/9 produced in the sheet metal strip 7 external to the center part 1 are shown, only as an example, as being identical. Otherwise, according to the embodiment according to FIG. 4, the inner ring and the outer ring are stamped respectively as full rings from the sheet metal strip 7. Of course, in the embodiment according to FIG. 7 only the inner rings or only the outer rings are stamped as full rings, as has been explained in an exemplary fashion with the aid of FIGS. 2 and 3.

Figure 8:
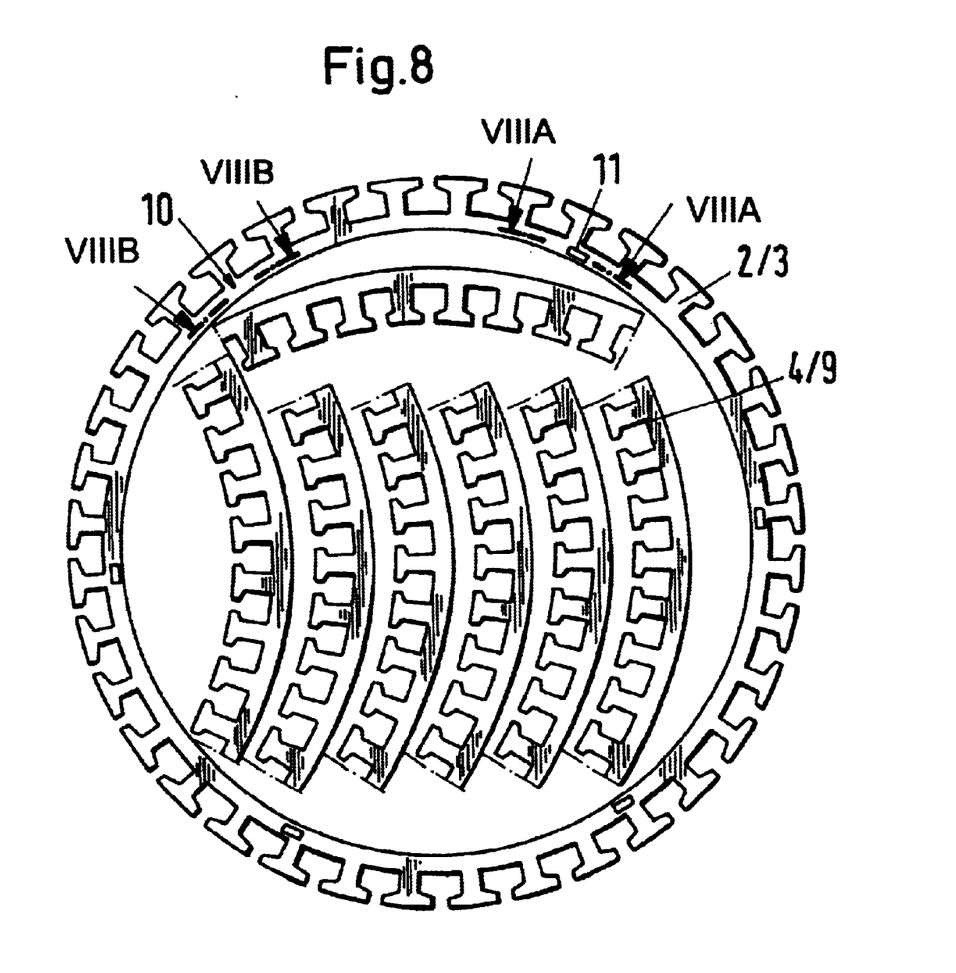
FIG. 8 is a further embodiment according to the invention where a full ring is stamped out of the sheet metal and partial ring segments are stamped from the center part.
Figure 8A:
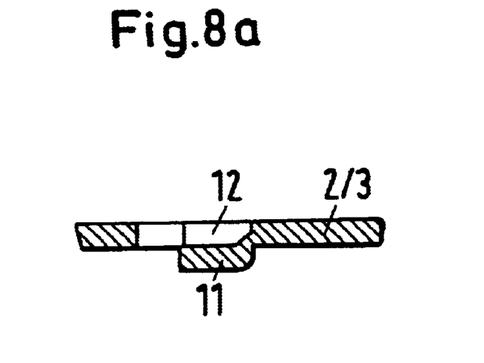
FIG. 8a is a section along the line VIIIA—VIIIA of FIG. 8.

FIG. 8 shows a full ring which in the shown embodiment is an inner ring. Of course, it can also be embodied as an outer ring. The partial ring segments 4/9 are again produced of the center part 1 and the corresponding inner or outer ring is produced therefrom. The full ring 2/3 has distributed over its circumference positive-locking elements, with which the individual full rings can be connected to one another by an interlocking method in a stacked arrangement. FIG. 8a shows a first embodiment of these positive-locking elements 11 which are bent out of the plane of the full ring 2/3. The positive-locking elements 11 are bent out of the plane by the thickness of the full ring 2/3 and are formed as tongues projecting in the circumferential direction of the full ring. As a result of this positive-locking element 11 bent out of the plane, the full ring is provided with a corresponding opening 12 which is longer than the positive-locking element 11 in the circumferential direction of the full ring 2/3.

An outer and/or an inner ring is produced of the full rings 2/3 by the interlocking method, well known in the art, wherein the full rings are stacked such that the tongue-shaped positive-locking elements 11 of the respective upper full ring engages the corresponding openings 12 of the full ring positioned underneath. Since the openings 12 in the circumferential direction of the full rings 2, 3 are longer than the positive-locking elements 11, the stacked full rings 2/3, which are positive-lockingly connected to one another via the positive-locking elements 11, can be rotated relative to one another in order to generate in this way a twist of the grooves. Since the interlocking method is known in the art, it will not be explained in more detail in this connection.

Figure 8B:
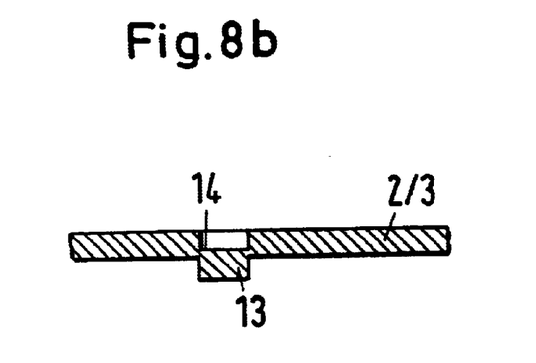
FIG. 8b is a section along the line VIIIB—VIIIB of FIG. 8.

FIG. 8b shows the possibility to provide as a positive-locking element 13 dimples or projections embossed into the plane of the full ring 2/3. By means of these dimples 13, the full rings 2/3 can also be positive-lockingly connected with one another, wherein the dimple 13 of the respective upper full ring 2/3 engages the corresponding circular depression 14 of the respective full ring 2/3 arranged underneath. Since the depressions 14 are formed by the projections 13, successively arranged positive-locking elements cannot be stacked such that they are rotated relative to one another. In this case the grooves of the inner and/or of the outer ring are axis parallel.

The different positive-locking elements 11, 13 are, of course, not provided simultaneously on the full ring 2/3. The full ring 2/3 is provided only with the positive-locking elements 11 or 13.

Figure 9:
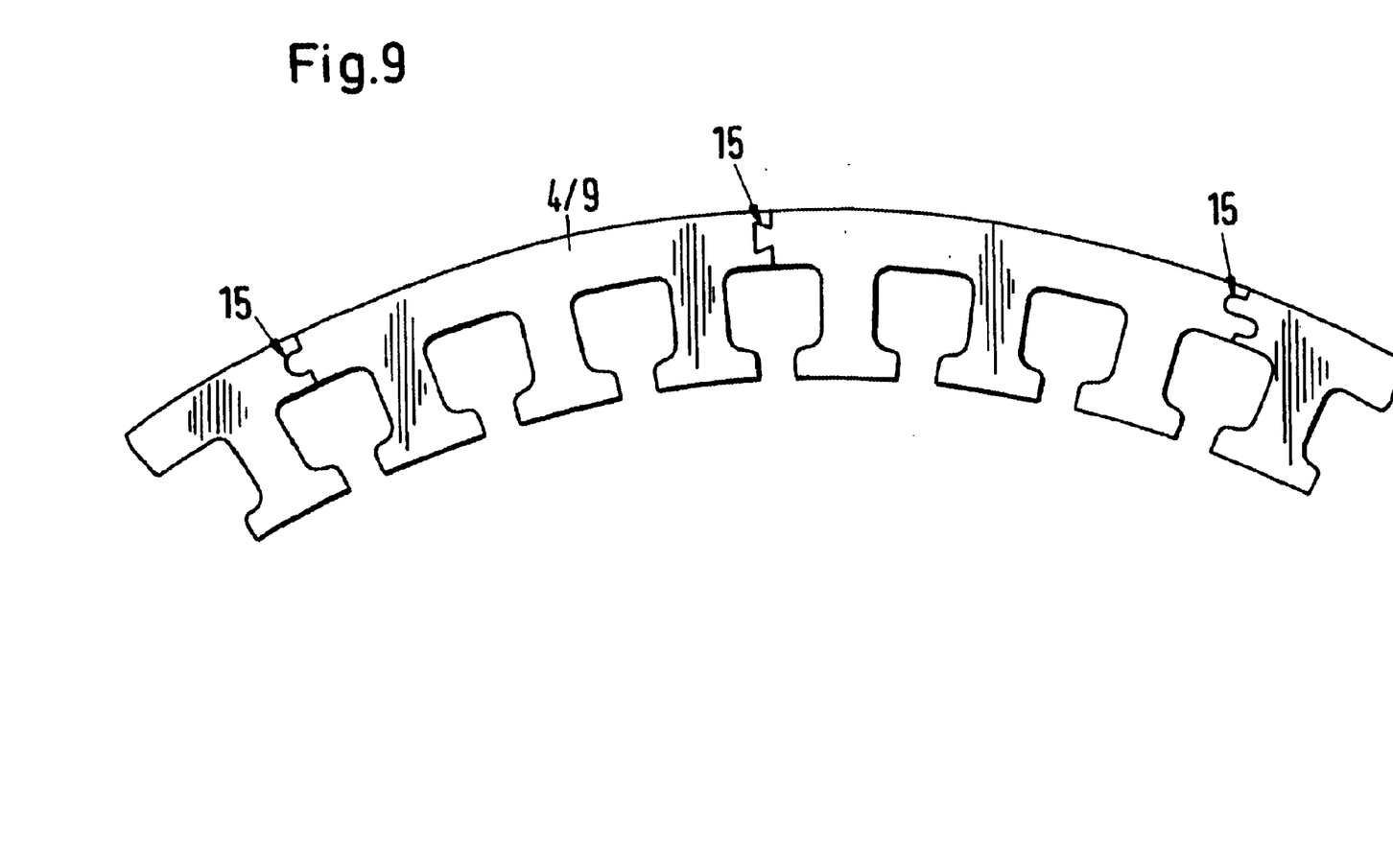
FIG. 9 shows the connection of partial ring segments to a ring.

In order to assemble the partial ring segments 4/9 to a full ring, they are provided at their ends with positive-locking elements 15. FIG. 9 shows different embodiments of such positive-locking elements 15. The positive-locking elements 15 provided at both ends of the partial ring segments 4/9 are arranged so as to be complementary to one another. One positive-locking element 15 projects in the circumferential direction past the partial ring segment while the corresponding positive-locking element at the other end of this partial ring segment 4/9 is in the form of a matching depression.

The positive-locking element 15 shown in FIG. 9 to the left is formed by an approximately semi-circular projection which engages a matching semi-circular depression of the neighboring partial ring segment 4/9.

The centrally arranged positive-locking element 15 of FIG. 9 is a dovetail-shaped projection engaging a matching dovetail-shaped depression at the other end of the neighboring partial ring segment.

One end of the partial ring segment 4/9 can be provided at the same time with a positive-locking element (15) projecting in the circumferential direction as well with a positive locking element in the form of a depression which is then engaged by the corresponding positive-locking projection of the neighboring partial ring segment 4/9 projecting in the circumferential direction. This is illustrated in FIG. 9 for the positive-locking element 15, shown to the right.

The positive-locking elements 15 serve particularly also as positioning aids with which the individual partial ring segments can be assembled in a simple way to a full ring.

Figure 10:
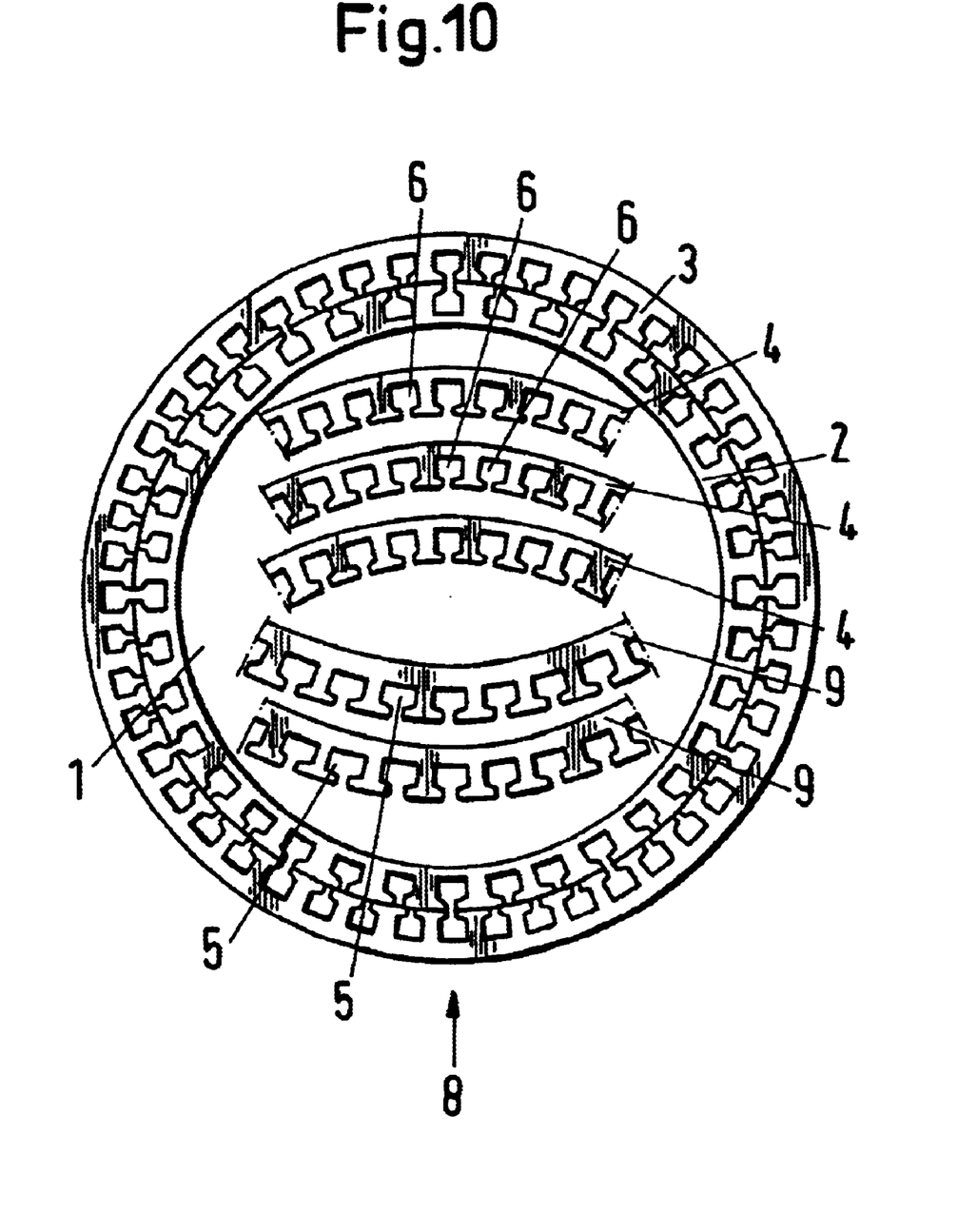
FIG. 10 shows a further embodiment according to the invention wherein two full rings are stamped out of the sheet metal and partial ring segments are stamped out of the center part.

FIG. 10 shows the possibility to produce partial ring segments 4 and partial ring segments 9 from the center part 1. In the case of the partial ring segments 4, the grooves 6 are provided on the inner periphery while in the case of the partial ring segments 9 the grooves 5 are provided at the outer periphery. Accordingly, an outer ring can be assembled of the partial ring segments 4 and an inner ring of the partial ring segments 9.

Corresponding to the embodiment according to FIG. 4, the inner ring 2 and the outer ring 3 are stamped of sheet metal in addition to the partial ring segments 4 and 9.

In the above described embodiments it is possible to produce the partial ring segments 4 and 9 of the center part 1. The partial ring segments 4, 9 are arranged relative to the stamping or rolling direction 8 such that the poles of the rotor or stator produced of the partial ring segments are positioned in the preferred direction and in this way a homogenous magnetic flux results. The partial ring segments 4 as well as the partial ring segments 9 can be of identical configuration. However, it is also possible to configure the partial ring segments 4 as well as the partial ring segments 9 so as to have different lengths relative to one another.

Since in the described embodiments the center part 1 is used for manufacturing the partial ring segments 4, 9, the sheet metal strip 7, 10 is optimally used. When also the intermediate spaces of the sheet metal 7 between the stamped-out parts are used for manufacturing the partial ring segments 4, 9 (FIG. 7), an excellent optimal material utilization results. The partial ring segments can be produced such of the center part 1 that in the assembled rotor and/or stator the magnetic flux direction of the stator poles is in the rolling direction 8 (preferred direction). For the stator and the rotor the same sheet metal quality is used. When in the cutting device sufficient space is present, partial ring segments can also be stamped as compensation segments, for example, with a smaller segment angle, as illustrated in an exemplary fashion in FIG. 7.

The positive-locking elements 11, 13 (FIGS. 8a and 8b) cannot only be provided on the full rings but also on the partial ring segments 4/9. It is then possible to connect full rings, assembled of partial ring segments, to laminated cores by the interlocking method. These full rings formed of the partial ring segments can then also be rotated relative to one another for generating a twist of the grooves when the tongue-shaped positive-locking elements 11 according to FIG. 8a are used.

The partial ring segments 4, 9 can also be connected by the interlocking method to core segments which are then assembled to a complete laminated core.

While specific embodiments of the invention have been shown and described in detail to illustrate the inventive principles, it will be understood that the invention may be embodied otherwise without departing from such principles.

What is claimed is:

1. A method for manufacturing annular core laminations for laminated cores of rotors and stators, said method comprising the steps of:

stamping a full ring and at least one partial ring segment out of sheet metal, wherein the at least one partial ring segment is stamped from a first portion of the sheet metal forming a central part surrounded by a second portion of the sheet metal, wherein the full ring is cut from the second portion of the sheet metal such that an inner circumference of the full ring and an outer circumference of the central part coincide, wherein the full ring forms a first integral annular core lamination; and forming a second divided annular core lamination from the at least one partial ring segment.

2. The method according to claim 1, wherein said step of cutting is carried out simultaneously to said step of stamping in a follow-on tool.

3. The method according to claim 1, wherein said step of cutting is carried out subsequently to said step of stamping.

4. The method according to claim 1, wherein in said step of cutting several of the partial ring segments are cut in at least two partial cutting steps.

5. The method according to claim 1, wherein, prior to said step of cutting the partial ring segments out of the central part, grooves are formed on the full ring and wherein said step of cutting the partial ring segments is carried out prior to said step of stamping.

6. The method according to claim 5, wherein said step of cutting comprises at least two partial cutting steps.

7. The method according to claim 5, wherein said step of stamping comprises at least two partial stamping steps.

8. The method according to claim 1, wherein the sheet metal is a narrow strip.

9. The method according to claim 1, wherein the sheet metal is a scroll strip.

10. The method according to claim 1, further comprising the step of

11. The method according to claim 1, further comprising the step of forming grooves at an inner periphery or an outer periphery of the partial ring segments.

* * * * *